US006978658B1

(12) United States Patent
Kochersperger

(10) Patent No.: US 6,978,658 B1
(45) Date of Patent: Dec. 27, 2005

(54) PROXIMITY SENSOR WITH SELF COMPENSATION FOR MECHANISM INSTABILITY

(75) Inventor: Peter Kochersperger, Easton, CT (US)

(73) Assignee: ASML Holding N.V., (NL)

( * ) Notice: Subject to any disclaimer, the term of this patent is extended or adjusted under 35 U.S.C. 154(b) by 0 days.

(21) Appl. No.: 11/015,652

(22) Filed: Dec. 20, 2004

(51) Int. Cl.[7] .............................................. G01B 13/08
(52) U.S. Cl. ...................................................... 73/37.5
(58) Field of Search ............................... 73/37.5, 37.6, 73/37.9

(56) References Cited

U.S. PATENT DOCUMENTS

| | | | | |
|---|---|---|---|---|
| 2,986,924 | A | 6/1961 | Becker | 73/37.5 |
| 3,026,714 | A | 3/1962 | Evans et al. | 73/37.7 |
| 3,433,408 | A | 3/1969 | Bellman et al. | 235/201 |
| 3,482,433 | A | 12/1969 | Gladwyn | 73/37.5 |
| 3,792,609 | A | 2/1974 | Blair et al. | 73/205 |
| 3,904,960 | A * | 9/1975 | Niehaus | 324/696 |
| 4,041,584 | A | 8/1977 | Williamson | 28/269 |
| 4,142,401 | A * | 3/1979 | Wilson | 73/37.5 |
| 4,173,143 | A * | 11/1979 | Venton-Walters | 73/861.22 |
| 4,179,919 | A | 12/1979 | McKechnie | 73/37.5 |
| 4,187,715 | A | 2/1980 | Nevitt | 73/37.9 |
| 4,550,592 | A | 11/1985 | Dechape | 73/37.5 |
| 4,579,005 | A * | 4/1986 | Brown | 73/861.25 |
| 4,583,917 | A | 4/1986 | Shah | 417/63 |
| 4,607,960 | A * | 8/1986 | Wulff | 374/7 |
| 4,655,089 | A * | 4/1987 | Kappelt et al. | 73/861.356 |
| 4,953,388 | A | 9/1990 | Barada | 73/37.5 |
| 4,971,517 | A | 11/1990 | Perkey et al. | 415/14 |
| 5,184,503 | A | 2/1993 | Hancock | 73/37.5 |
| 5,317,898 | A | 6/1994 | Nemeth | 73/37.7 |
| 5,341,100 | A * | 8/1994 | Taylor | 324/341 |
| 5,429,001 | A * | 7/1995 | Kleven | 73/861.22 |
| 5,503,035 | A * | 4/1996 | Itoh et al. | 73/861.23 |
| 5,540,082 | A | 7/1996 | Okuyama et al. | 73/37.5 |
| 6,152,162 | A | 11/2000 | Balazy et al. | 137/110 |
| 6,237,404 | B1 * | 5/2001 | Crary et al. | 73/152.03 |
| 6,244,121 | B1 | 6/2001 | Hunter | 73/865.9 |
| 6,831,452 | B2 * | 12/2004 | McTigue | 324/72.5 |

FOREIGN PATENT DOCUMENTS

| | | |
|---|---|---|
| GB | 1 399 397 | 11/1982 |
| JP | 57-191507 | 7/1975 |

OTHER PUBLICATIONS

Burrows, V.R., "The Principles and Application of Pneumatic Guaging," FWP Journal, Oct. 1976, pp 31-42.

Derwent Abstract Accession No. 86-324714/49, SU 1225634 A (KIEV AUTOM INST) Apr. 23, 1986.

Pending U.S. Appl. No. 10/322,768, High Resolution Gas Gauge Proximity Sensor, filed Dec. 19, 2002 by Gajdeczko et al.

(Continued)

*Primary Examiner*—Hezron Williams
*Assistant Examiner*—John Fitzgerald
(74) *Attorney, Agent, or Firm*—Sterne, Kessler, Goldstein & Fox, P.L.L.C.

(57) ABSTRACT

A retractable proximity sensor system with a self-compensating mechanism to reduce the impact of mechanical instability on the precision of a proximity sensor is disclosed. The retractable proximity sensor system includes a retractable proximity sensor and a proximity sensor housing in which the housing includes a reference plate that is either integral or affixed to the housing. The proximity sensor precisely detects very small distances between a measurement probe and a work surface, such as, for example, a semiconductor wafer. A method is provided for extending and retracting a proximity sensor and compensating for the drift associated with the mechanical instability of a proximity sensor head to improve precision.

17 Claims, 5 Drawing Sheets

OTHER PUBLICATIONS

Pending U.S. Appl. No. 10/683,271, Liquid Flow Proximity Sensor for Use in Immersion Lithography, filed Oct. 14, 2003 by Violette, Kevin.

Pending U.S. Appl. No. 10/646,720, High Resolution Gas Gauge Proximity Sensor, filed Aug. 25, 2003 by Joesph Lyons.

Pending U.S. Appl. No. 10/894,028, Fluid Gauge Proximity Sensor and Method of Operating Same Using a Modulated Fluid Flow, filed Jul. 20, 2004 by Galburt et al.

Pending U.S. Appl. No. 10/854,429, Gas Gauge Proximity Sensor with a Modulated Gas Flow, filed May 27, 2004 by Ebert et al.

Pending U.S. Appl. No. 10/833,249, High Resolution Gas Gauge Proximity Sensor, filed Apr. 28, 2004 by Carter et al.

Proximity Sensor Nozzle Shroud with Flow Curtain, filed Dec. 7, 2004 by Herman Vogel.

* cited by examiner

PROXIMITY SENSOR WITH SELF COMPENSATION FOR MECHANISM INSTABILITY

BACKGROUND OF THE INVENTION

1. Field of the Invention

The present invention relates to an apparatus and method for detecting very small distances, and more particularly to proximity sensing.

2. Background Information

Many automated manufacturing processes require the sensing of the distance between a manufacturing tool and the product or material surface being worked. In some situations, such as semiconductor lithography, the distance must be measured with accuracy approaching a nanometer.

The challenges associated with creating a proximity sensor of such accuracy are significant, particularly in the context of photolithography systems. In the photolithography context, in addition to being non-intrusive and having the ability to precisely detect very small distances, the proximity sensor can not introduce contaminants or come in contact with the work surface, typically a semiconductor wafer. Occurrence of either situation may significantly degrade or ruin the semiconductor quality.

Different types of proximity sensors are available to measure very small distances. Examples of proximity sensors include capacitance and optical gauges. These proximity sensors have serious shortcomings when used in photolithography systems because physical properties of materials deposited on wafers may impact the precision of these devices. For example, capacitance gauges, being dependent on the concentration of electric charges, can yield spurious proximity readings in locations where one type of material (e.g., metal) is concentrated. Another class of problems occurs when exotic wafers made of non-conductive and/or photosensitive materials, such as Gallium Arsenide (GaAs) and Indium Phosphide (InP), are used. In these cases, capacitance and optical gauges may provide spurious results.

U.S. Pat. No. 4,953,388, entitled Air Gauge Sensor, issued Sep. 4, 1990 to Andrew Barada ("'388 patent"), and U.S. Pat. No. 4,550,592, entitled Pneumatic Gauging Circuit, issued Nov. 5, 1985 to Michel Deschape ("'592 patent"), disclose an alternative approach to proximity sensing that uses an air gauge sensor. U.S. Pat. Nos. 4,953,388 and 4,550,592 are incorporated herein by reference in their entireties. These sensors use reference and measurement nozzles to emit an air flow onto reference and measurement surfaces and measure back pressure differences within the sensors to measure the distance between the measurement nozzle and the measurement surface.

Furthermore, principles of pneumatic gauging are discussed in Burrows, V. R., *The Principles and Applications of Pneumatic Gauging*, FWP Journal, October 1976, pp. 31–42, which is incorporated herein by reference in its entirety. An air gauge sensor is not vulnerable to concentrations of electric charges or electrical, optical and other physical properties of a wafer surface. Current semiconductor manufacturing, however, requires that proximity is gauged with high precision on the order of nanometers. Earlier versions of air gauge sensors, however, often do not meet today's lithography requirements for precision.

As indicated above proximity sensors must be non-intrusive. Contact between a proximity sensor and a work surface can significantly degrade or run the semiconductor quality of quality of other work surface. However, to ensure the greatest level of precision often the measurement nozzle must be extremely close to the work surface. In certain circumstances, as higher levels of precision are required, the movement of a wafer stage or other work platform is such that it is desirable to move a proximity sensor toward and away from a work surface. This leads to another source of imprecision related to the mechanical stability of a proximity sensor head, which is move up and down. When the sensor head is extended it can drift thereby reducing the accuracy of the proximity sensor.

What is needed is a retractable proximity sensor that includes a self compensating mechanism to reduce the impact of proximity sensor head drift on the accuracy of the proximity sensor.

SUMMARY OF THE INVENTION

The present invention provides a retractable proximity sensor system with a self-compensating mechanism to reduce the impact of mechanical instability on the precision of a proximity sensor. The retractable proximity sensor system includes a retractable proximity sensor and a proximity sensor housing in which the housing includes a reference plate that is either integral or affixed to the housing. The proximity sensor precisely detects very small distances between a measurement probe and a surface. A method is provided for extending and retracting a proximity sensor and compensating for the drift associated with the mechanical instability of a proximity sensor head.

Further embodiments, features, and advantages of the invention, as well as the structure and operation of the various embodiments of the invention are described in detail below with reference to accompanying drawings.

BRIEF DESCRIPTION OF THE FIGURES

The present invention is described with reference to the accompanying drawings. In the drawings, like reference numbers indicate identical or functionally similar elements.

DETAILED DESCRIPTION OF THE INVENTION

Figure 1:
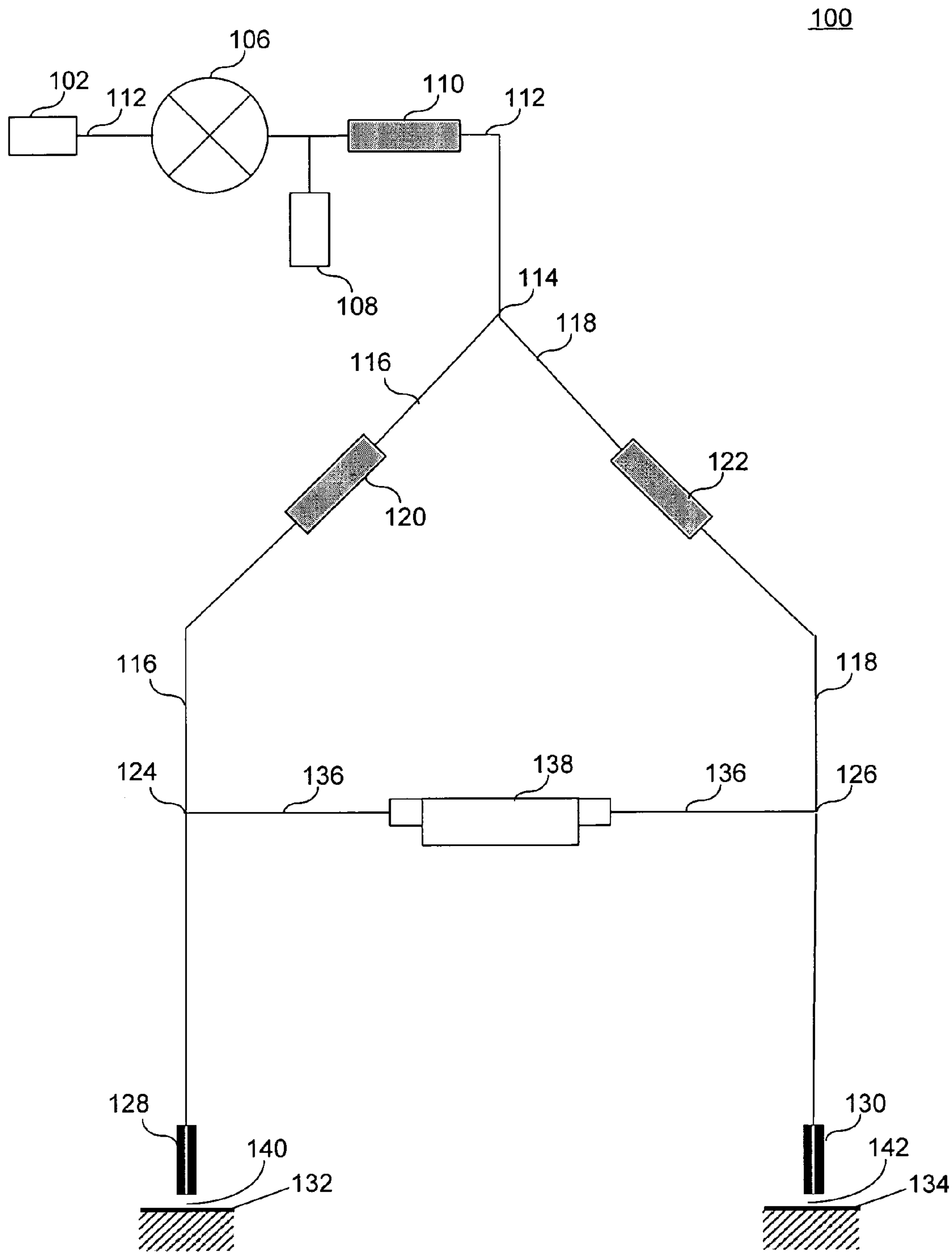
FIG. 1 is a diagram of a proximity sensor, according to an embodiment of the present invention.

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the present invention would be of significant utility.

Co-pending, commonly owned U.S. patent application Ser. No. 10/322,768, entitled High Resolution Gas Gauge Proximity Sensor, filed Dec. 19, 2002 by Gajdeczko et al., ("'768 patent Application") describes a high precision gas gauge proximity sensor that overcomes some of the precision limitations of earlier air gauge proximity sensors. The precision limitations are overcome by the introduction of porous snubbers to reduce turbulence in the flow of gases and thereby increase precision. The '768 patent Application, which is incorporated herein by reference in its entirety, describes a gas gauge proximity sensor that provides a high degree of accuracy.

Similarly, co-pending, commonly owned U.S. patent application Ser. No. 10/683,271, entitled Liquid Flow Proximity Sensor for Use in Immersion Lithography, filed Oct. 14, 2003, by Violette, Kevin, ("'271 patent Application") describes a high precision immersion lithography proximity sensor that provides a high degree of precision in an immersion lithography application. The '271 patent Application is incorporated herein by reference in its entirety.

Co-pending, commonly owned U.S. patent application Ser. No. 10/646,720, entitled High Resolution Gas Gauge Proximity Sensor, filed Aug. 25, 2003, by Joseph Lyons, ("'720 patent Application"), describes a proximity sensor in which a specialized nozzle is used to further increase precision and eliminate areas of insensitivity on a measurement surface during measurement operation. The '720 patent Application is incorporated herein by reference in its entirety.

A source of imprecision in proximity sensors are external disturbances. In particular with respect to immersion lithography, when liquid flow proximity sensors use a steady flow of fluid, this may lead to contamination and thermal conditioning. Furthermore, proximity sensors used in immersion lithography can be sensitive to low frequency external acoustical interference and sensor offset errors. Co-pending, commonly owned U.S. patent application Ser. No. 10/894,028, entitled Fluid Gauge Proximity Sensor and Method of Operating Same Using a Modulated Fluid Flow, filed Jul. 20, 2004, by Galburt et al., ("'028 patent Application") describes a fluid flow proximity sensor that includes a source of modulated unidirectional or alternating fluid flow that can be modulated at a particular frequency to address the above operating challenges. The '028 patent Application is incorporated herein by reference in its entirety.

External acoustical interference can also impact gas gauge proximity sensors. Co-pending, commonly owned U.S. patent application Ser. No. 10/854,429 entitled Gas Gauge Proximity Sensor with a Modulated Gas Flow, filed May 27, 2004, by Ebert et al., ("'429 patent Application") describes a gas gauge proximity sensor that modulates a gas stream at a modulated frequency in which there is minimal acoustical interference energy, thereby improving measurement precision. The '429 patent Application is incorporated herein by reference in its entirety.

While the sensors disclosed in the '768, '271, '720, '028, and '429 patent applications provide a high degree of precision, the precision can be impacted by changes in local environmental conditions near measurement and reference nozzles. In one circumstance, even though the nozzles are often very close together minor differences in environmental conditions can impact sensor accuracy. Co-pending, commonly owned U.S. patent application Ser. No. 10/833,249 entitled High Resolution Gas Gauge Proximity Sensor, filed Apr. 28, 2004, by Carter et al., ("'249 patent Application") describes a gas gauge proximity sensor that includes a chamber that reduces environmental differences across measurement and references nozzles. The '249 patent Application is incorporated herein by reference in its entirety.

A similar problem relates to cross flows of gas or liquid that intersect the stream of gas or liquid that is being emitted from a measurement channel of the proximity sensor. Specifically, purging gases, for example, can exhibit local cross winds with velocities of the order of a few meters per second. Cross-winds or cross-flows will cause gauge instability and drift, introducing non-calibratable errors within proximity sensors. Co-Pending, commonly owned U.S. patent application, Ser. No. 11/005,246, entitled Proximity Sensor Nozzle Shroud with Flow Curtain, filed Dec. 7, 2004, by Herman Vogel (Ser. No. 11/005,246) describes a proximity sensor that includes a shroud around the nozzles to reduce the impact on cross winds. The Ser. No. 11/005,246 is incorporated herein by reference in its entirety.

As indicated above proximity sensors must be non-intrusive. In certain circumstances, as higher levels of precision are required, the movement of a wafer stage or other work platform is such that it is desirable to move a proximity sensor toward and away from a work surface. This leads to another source of imprecision related to the mechanical stability of a proximity sensor head, which is moved up and down. The present invention addresses this operational challenge.

To demonstrate the present invention, FIG. 1 provides a diagram of gas gauge proximity sensor 100, according to an embodiment of the present invention. Gas gauge proximity sensor 100 is one type of proximity sensor that can be improved through use of the present invention, and is not intended to limit the scope of the invention. Gas gauge proximity sensor 100 includes mass flow controller 106, central channel 112, measurement channel 116, reference channel 118, measurement channel restrictor 120, reference channel restrictor 122, measurement probe 128, reference probe 130, bridge channel 136 and mass flow sensor 138. Gas supply 102 injects gas at a desired pressure into gas gauge proximity sensor 100.

Central channel 112 connects gas supply 102 to mass flow controller 106 and then terminates at junction 114. Mass flow controller 106 maintains a constant flow rate within gas gauge proximity sensor 100. Gas is forced out from mass flow controller 106 through a porous snubber 110, with an accumulator 108 affixed to channel 112. Snubber 110 reduces gas turbulence introduced by the gas supply 102, and its use is optional. A more complete description of snubber 110 can be found in the '249 patent application. Upon exiting snubber 110, gas travels through central channel 112 to junction 114. Central channel 112 terminates at junction 114 and divides into measurement channel 116 and reference channel 118. Mass flow controller 106 injects gas at a sufficiently low rate to provide laminar and incompressible fluid flow throughout the system to minimize the production of undesired pneumatic noise. Likewise, the system geometry can be appropriately sized to maintain the laminar flow characteristics established by mass flow controller 106.

Bridge channel 136 is coupled between measurement channel 116 and reference channel 118. Bridge channel 136 connects to measurement channel 116 at junction 124. Bridge channel 136 connects to reference channel 118 at junction 126. In one example, the distance between junction 114 and junction 124 and the distance between junction 114 and junction 126 are equal.

All channels within gas gauge proximity sensor 100 permit gas to flow through them. Channels 112, 116, 118, and 136 can be made up of conduits (tubes, pipes, etc.) or any other type of structure that can contain and guide gas flow through sensor 100. It is preferred that the channels do not have sharp bends, irregularities or unnecessary obstructions that may introduce pneumatic noise, for example, by producing local turbulence or flow instability. The overall lengths of measurement channel 116 and reference channel 118 can be equal or in other examples can be unequal.

Reference channel 118 terminates into reference nozzle 130. Likewise, measurement channel 116 terminates into measurement nozzle 128. Reference nozzle 130 is positioned above reference surface 134. Measurement nozzle 128 is positioned above measurement surface 132. In the context of photolithography, measurement surface 132 is often a semiconductor wafer, stage supporting a wafer, flat panel display, a print head, a micro- or nanofluidic device or the like. Reference surface 134 can be a flat metal plate, but is not limited to this example. Gas injected by gas supply 102 is emitted from each of the nozzles 128, 130 and impinges upon measurement surface 132 and reference surface 134. As stated above, the distance between a nozzle and a corresponding measurement or reference surface is referred to as a standoff.

Measurement channel restrictor 120 and reference channel restrictor 122 serve to reduce turbulence within the channels and act as a resistive element. In other embodiments, orifices can be used. Although orifices will not reduce turbulence.

In one embodiment, reference nozzle 130 is positioned above a fixed reference surface 134 with a known reference standoff 142. Measurement nozzle 128 is positioned above measurement surface 132 with an unknown measurement standoff 140. The known reference standoff 142 is set to a desired constant value representing an optimum standoff. With such an arrangement, the backpressure upstream of the measurement nozzle 128 is a function of the unknown measurement standoff 140; and the backpressure upstream of the reference nozzle 130 is a function of the known reference standoff 142. If standoffs 140 and 142 are equal, the configuration is symmetrical and the bridge is balanced. Consequently, there is no gas flow through bridging channel 136. On the other hand, when the measurement standoff 140 and reference standoff 142 are different, the resulting pressure difference between the measurement channel 116 and the reference channel 118 induces a flow of gas through mass flow sensor 138.

Mass flow sensor 138 is located along bridge channel 136, preferably at a central location. Mass flow sensor 136 senses gas flows induced by pressure differences between measurement channel 116 and reference channel 118. These pressure differences occur as a result of changes in the vertical positioning of measurement surface 132. For a symmetric bridge, when measurement standoff 140 and reference standoff 142 are equal, the standoff is the same for both of the nozzles 128, 130 compared to surfaces 132, 134. Mass flow sensor 138 will detect no mass flow, since there will be no pressure difference between the measurement and reference channels. Differences between measurement standoff 140 and reference standoff 142 will lead to different pressures in measurement channel 116 and reference channel 118. Proper offsets can be introduced for an asymmetric arrangement.

Mass flow sensor 138 senses gas flow induced by a pressure difference or imbalance. A pressure difference causes a gas flow, the rate of which is a unique function of the measurement standoff 140. In other words, assuming a constant flow rate into gas gauge 100, the difference between gas pressures in the measurement channel 116 and the reference channel 118 is a function of the difference between the magnitudes of standoffs 140 and 142. If reference standoff 142 is set to a known standoff, the difference between gas pressures in the measurement channel 116 and the reference channel 118 is a function of the size of measurement standoff 140 (that is, the unknown standoff between measurement surface 132 and measurement nozzle 128).

Mass flow sensor 138 detects gas flow in either direction through bridge channel 136. Because of the bridge configuration, gas flow occurs through bridge channel 136 only when pressure differences between channels 116, 118 occur. When a pressure imbalance exists, mass flow sensor 138 detects a resulting gas flow, and can initiate an appropriate control function. Mass flow sensor 138 can provide an indication of a sensed flow through a visual display or audio indication. Alternatively, in place of a mass flow sensor, a differential pressure sensor may be used. The differential pressure sensor measures the difference in pressure between the two channels, which is a function of the difference between the measurement and reference standoffs.

Proximity sensor 100 is provided as one example of a device with a nozzle that can benefit from the present invention. The invention is not intended to be limited to use with only proximity sensor 100. Rather the invention can be used with other types of proximity sensors, such as, for example, the proximity sensors disclosed in the '388 and '592 patent, and the '768, '271, '720, '028, '429, '249 and Ser. No. 11/005,246.

Figure 2:
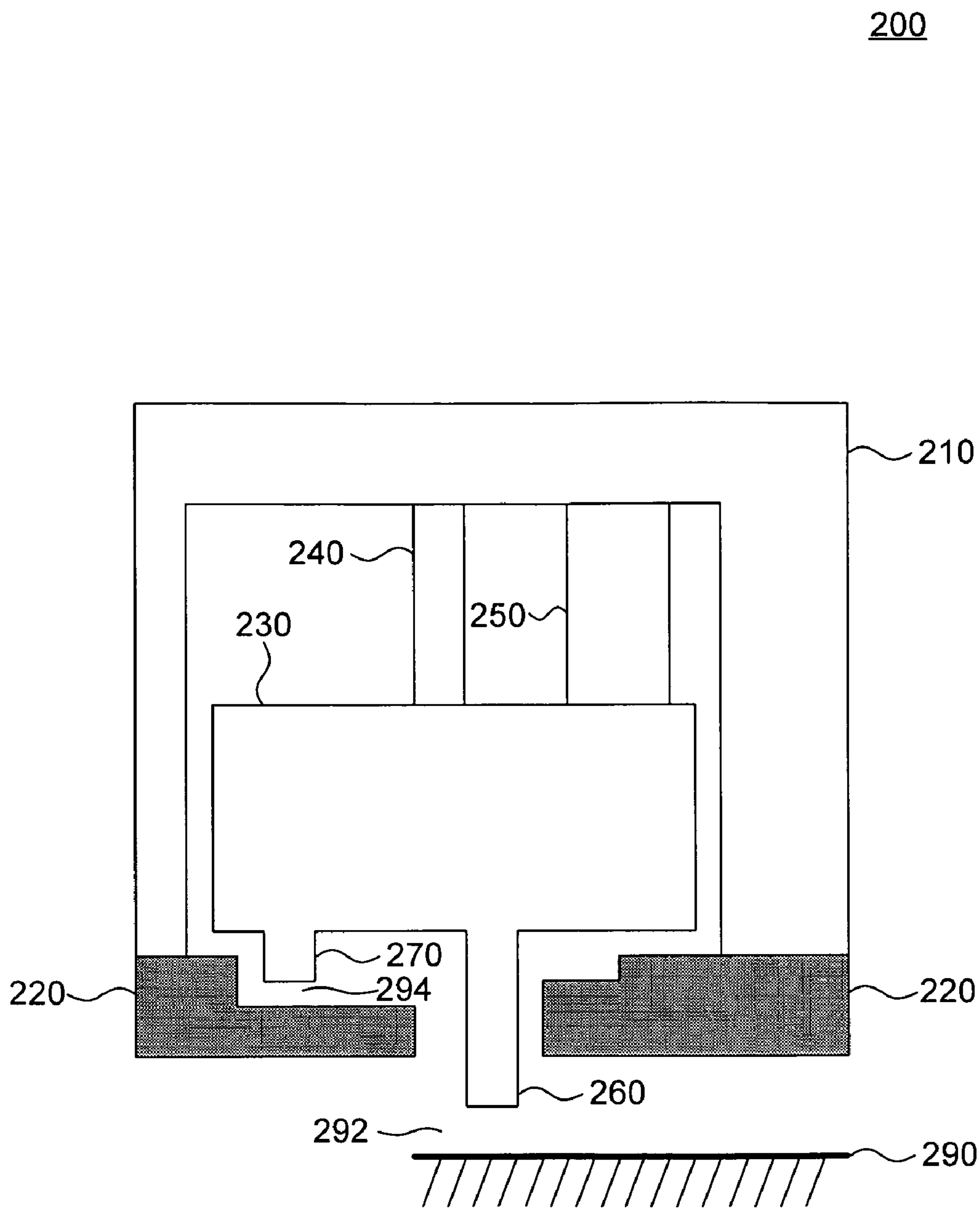
FIG. 2 is a diagram of a retractable proximity sensor system in an extended position, according to an embodiment of the invention.

FIG. 2 is a cross sectional diagram of retractable proximity sensor system 200 in an extended position according to an embodiment of the invention. Retractable proximity sensor system 200 includes proximity sensor housing 210, reference plate 220, proximity sensor head 230, retract spring 240, actuator guide 250, measurement nozzle 260 and reference nozzle 270. Collectively, proximity sensor head 230, retract spring 240, actuator guide 250, measurement nozzle 260 and reference nozzle 270 form a retractable proximity sensor. Referring to FIG. 1, proximity sensor head 230 would include the components of proximity sensor 100 except for the measurement and reference nozzles, which are identified in FIG. 2 as measurement nozzle 260 and reference nozzle 270.

As industry demands greater precision from lithography tools, proximity sensors must have accuracies within the sub-ten nanometer accuracy. To obtain such accuracies, proximity sensors require a very small working distance on the order of 125 microns, which may not be compatible with wafer stage travel limits in lithography tools. As a result proximity sensors need to extend when in use and retract to a safe distance on the order of millimeters when not in use to avoid damaging a work surface, such as a silicon wafer.

Figure 3:
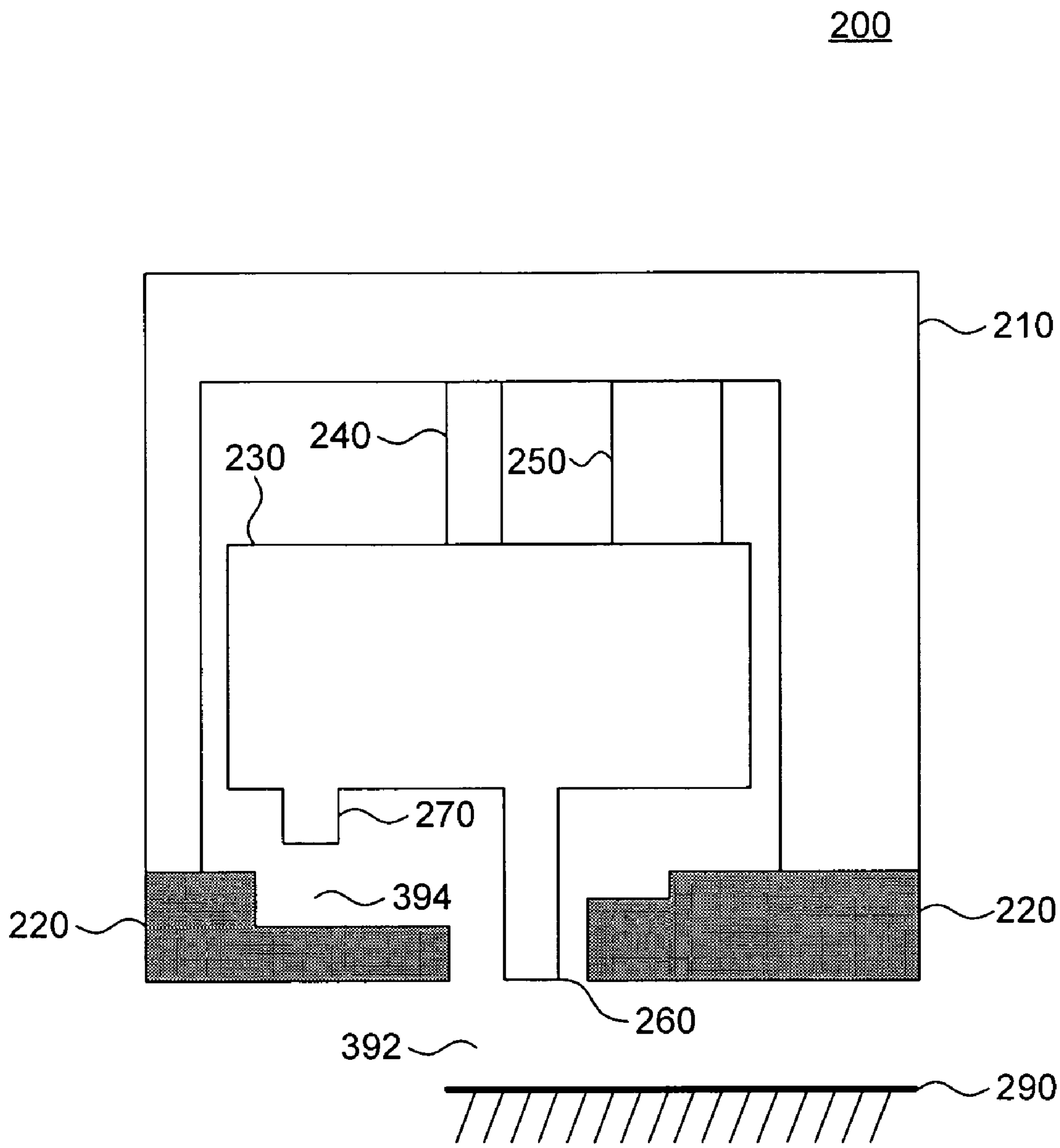
FIG. 3 is a diagram of a retractable proximity sensor system in a retracted position, according to an embodiment of the invention.

The invention provides a retractable proximity sensor system with a high degree of precision. Retract spring 240 and actuator guide 250 are attached to proximity sensor housing 210 and to the upper surface of proximity sensor head 230. When a measurement is required, an actuator within actuator guide 250 forces proximity sensor head 230 toward work surface 290. Work surface 290 can be a wafer, for example. When proximity sensor head 230 needs to be withdrawn to ensure clearance of work surface 290, retract spring 240 and actuator guide 250 retract proximity sensor head 230 into a retracted position, such as illustrated in FIG. 3. FIG. 3 shows that measurement standoff 392 is significantly larger than measurement standoff 292 depicted in FIG. 2. Likewise, reference standoff 394 is significantly larger than reference standoff 294, depicted in FIG. 2.

The difficulty that arises with respect to the use of a retractable proximity sensor system arises because the retracting mechanisms, such as retract spring 240 and actuator guide 250 lead to drift in the sensor proximity head 230. Thus, stability specifications, such as, for example drift less than five nanometers over a fifteen minute time interval are difficult to achieve.

In the situation when a reference surface is attached to the sensor proximity head 230 (not shown), an internal sensor to the proximity sensor housing 210 can be added to measure the drift. A correction can then be added to the proximity sensor measurement to account for the drift. One alternative for doing this is to add capacitive gauges within proximity sensor housing 210 to measure the drift. These gauges, however, add cost, complexity and introduce other measurement noises.

The present invention uses reference nozzle 270 to cancel out impacts due to the drift of sensor proximity head 230. This is achieved by having reference plate 220 mounted to the fixed structure of proximity sensor housing 210, not on the moving proximity sensor head 230. In alternative embodiments, reference plate 220 can be either affixed to proximity sensor housing 210 or an integral portion of proximity sensor housing 210. A wide variety of approaches for affixing reference plate 220 to proximity sensor housing 210 will be known by individuals skilled in the arts, based on the teachings herein. The shapes of reference plate 210 and proximity sensor housing 210 are for illustrative purposes, and not intended to limit the scope of the invention. The shapes can vary depending on the application.

After extending the proximity sensor head 230, when reference plate 270 is attached to the proximity sensor housing 210 the drift of proximity sensor head 230 changes both the measurement standoff 292 and reference standoff 294 by the same amount. As a result, a proximity sensor will automatically compensate for the drift, which will be effectively removed from the proximity sensor measurement.

Figure 4:
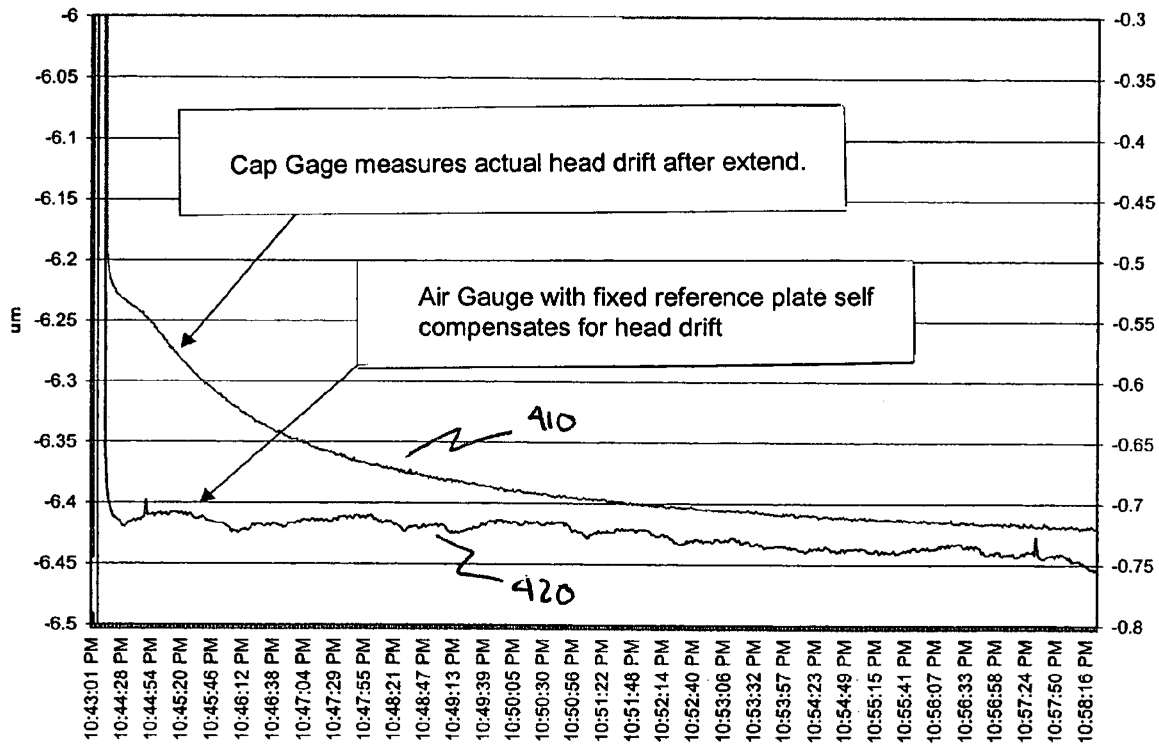
FIG. 4 is a chart that demonstrates how a retractable proximity sensor system compensates for mechanical drift, according to an embodiment of the invention.

FIG. 4 provides chart 400 that demonstrates how retractable proximity sensor system 200 compensates for proximity sensor head drift, according to an embodiment of the invention. Line 410 of chart 400 shows actual proximity sensor head drift after extension as measured by a capacitive gauge over a fifteen minute time interval. Line 410 shows that the head drift ranges from about 0.3 microns to 0.7 microns. Line 420 shows measurements for a retractable proximity sensor system, such as proximity sensor system 200, over a fifteen minute period. Line 420 shows that the measurements remain relatively constant, varying between approximately 6.4 microns and 6.45 microns, thereby showing that a retractable proximity sensor system, such as proximity sensor system 200 can compensate for drift.

Figure 5:
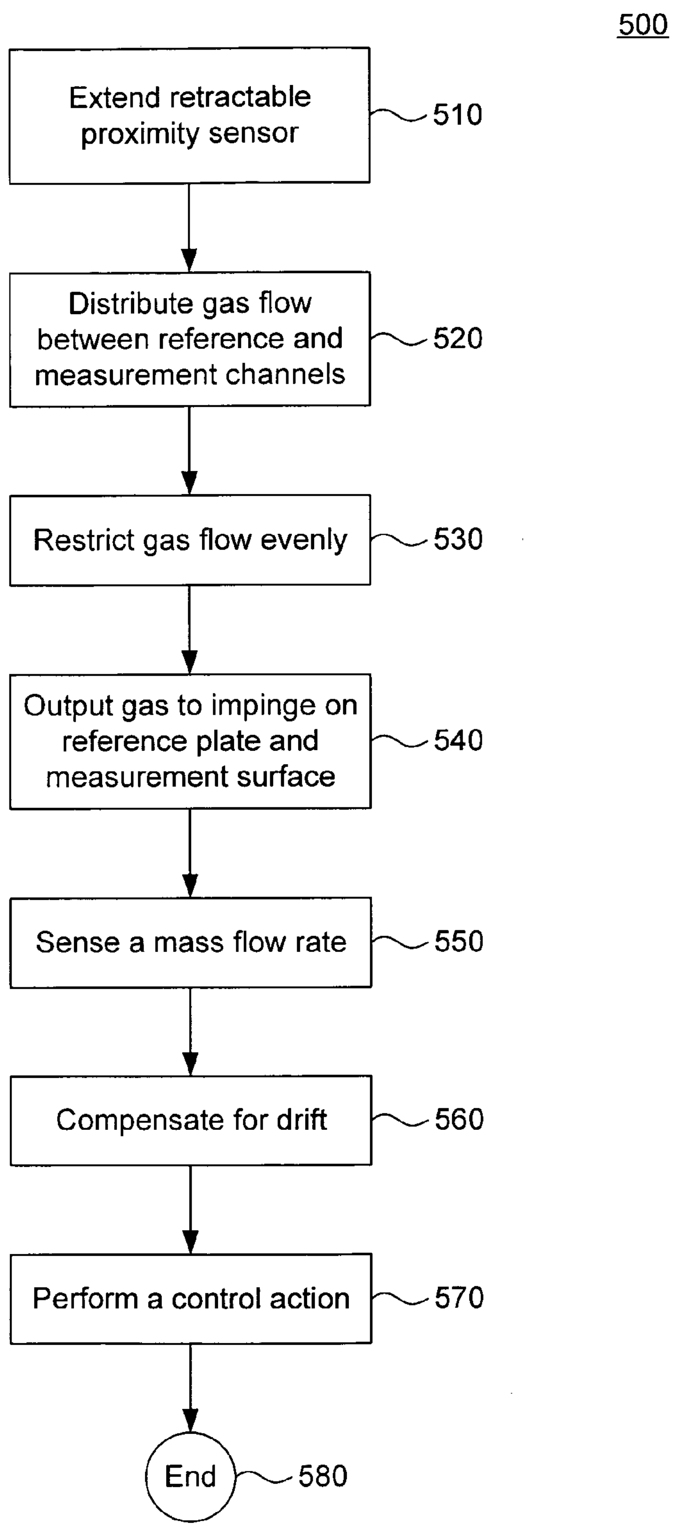
FIG. 5 is a flowchart of a method for using gas flow to detect very small distances, according to an embodiment of the invention.

The process illustrated in FIG. 5 presents a method 500 for using a proximity sensor system, such as proximity sensor system 200 to detect very small distances and perform a control action. For convenience, method 500 is described with respect to retractable proximity sensor system 200 and proximity sensor 100. However, method 500 is not necessarily limited by the structure of retractable proximity sensor system 200 or sensor 100, and can be implemented with a proximity sensor system with a different structure, including but not limited to liquid flow proximity sensor systems.

The process begins in step 510. In step 510, an operator or mechanical device extends a retractable proximity sensor in the direction of a measurement surface. For example, an operator or mechanical device positions measurement nozzle 260 above measurement surface 290.

In step 520, gas flow is distributed between measurement and reference channels. For example, gas gauge proximity sensor 100 causes the flow of the measurement gas to be evenly distributed between measurement channel 116 and reference channel 118.

In step 530, gas flow in the measurement channel and the reference channel is restricted evenly across cross-sectional areas of the channels. For example, measurement channel restrictor 120 and reference channel restrictor 122 restrict the flow of gas to reduce pneumatic noise and serve as a resistive element in gas gauge proximity sensor 100.

In step 540, gas is forced to exit from reference and measurement nozzles. For example, gas if forced to exit measurement nozzle 260 and reference nozzle 270. Gas exiting reference nozzle 270 if forced to impinge upon reference plate 220.

In step 550, a flow of gas is monitored through a bridge channel connecting a reference channel and a measurement channel.

In step 560 mechanical instability of a proximity sensor head is compensated for. The compensation occurs automatically as a result of the reference plate being affixed to a proximity sensor housing, such as proximity sensor housing 210.

In step 570, a control action is performed based on a pressure difference between the reference and measurement channel. For example, mass flow sensor 138 monitors mass flow rate between measurement channel 116 and reference channel 118. Based on the mass flow rate, mass flow sensor 138 initiates a control action. Such control action may include providing an indication of the sensed mass flow, sending a message indicating a sensed mass flow, initiating a servo control action to reposition the location of the measurement surface relative to the reference surface until no mass flow or a fixed reference value of mass flow is sensed, or retracting a proximity sensor head. In step 580, method 500 ends.

CONCLUSION

While various embodiments of the present invention have been described above, it should be understood that they have been presented by way of example, and not limitation. It will be apparent to persons skilled in the relevant art that various changes in form and detail can be made therein without departing from the spirit and scope of the invention.

The present invention has been described above with the aid of method steps illustrating the performance of specified functions and relationships thereof. The boundaries of these method steps have been arbitrarily defined herein for the convenience of the description. Alternate boundaries can be defined so long as the specified functions and relationships thereof are appropriately performed. Any such alternate boundaries are thus within the scope and spirit of the claimed invention. Thus, the breadth and scope of the present invention should not be limited by any of the above-described exemplary embodiments, but should be defined only in accordance with the following claims and their equivalents.

The Detailed Description section should primarily be used to interpret the claims. The Summary and Abstract sections may set forth one or more, but not all exemplary embodiments of the present invention as contemplated by the inventor(s), and thus, are not intended to limit claims.

What is claimed is:

1. A retractable proximity sensor system, comprising:

a retractable proximity sensor that determines a difference between a reference surface standoff and a measurement surface standoff; and a proximity sensor housing that supports said retractable proximity sensor, wherein said proximity sensor housing comprises a reference plate.

2. The retractable proximity sensor system of claim 1, wherein said reference plate is attached to said proximity sensor housing.

3. The retractable proximity sensor system of claim 1, wherein said reference plate is integral to said proximity sensor housing.

4. The retractable proximity sensor system of claim 1, wherein said retractable proximity sensor is a retractable gas gauge proximity sensor.

5. The retractable proximity sensor system of claim 4, wherein said retractable gas gauge proximity sensor, comprises:

a junction that divides gas input into the gas gauge proximity sensor into a reference channel and a measurement channel;

a reference nozzle at an end of the reference channel, whereby gas exits the reference channel through the reference nozzle and travels across a reference surface standoff to impinge upon a reference surface formed by said reference plate;

a measurement nozzle at an end of the reference measurement channel, whereby gas exits the measurement channel through the measurement nozzle and travels across a measurement surface standoff to impinge upon a measurement surface; and a measurement device coupled between the reference and measurement channels for sensing the mass flow of gas flow therebetween, whereby, the differences in standoffs between the reference and measurement surfaces can be sensed at a high sensitivity.

6. The retractable proximity sensor system of claim 1, wherein said retractable proximity sensor is a retractable liquid flow proximity sensor.

7. The retractable proximity sensor system of claim 6, wherein said retractable liquid flow proximity sensor, comprises:

a junction that divides liquid input into the liquid flow proximity sensor into a reference channel and a measurement channel;

a reference nozzle at an end of the reference channel, whereby liquid exits the reference channel through the reference nozzle and travels across a reference surface standoff to impinge upon a reference surface formed by said reference plate;

a measurement nozzle at an end of the measurement channel, whereby liquid exits the measurement channel through the measurement nozzle and travels across a measurement surface standoff to impinge upon a measurement surface; and a measurement device coupled between the reference and measurement channels for sensing a liquid flow therebetween, whereby, the differences in standoffs between the reference and measurement surfaces can be sensed at a high sensitivity.

8. A method for sensing a difference in a reference standoff and a measurement standoff using a retractable gas gauge proximity sensor housed in a proximity sensor housing having a reference plate, comprising:

(a) extending the retractable gas gauge proximity sensor toward the direction of a measurement surface;

(b) distributing a flow of gas between a measurement channel and a reference channel within the proximity sensor;

(c) restricting the flow of gas substantially evenly across cross-sectional areas of both the measurement and reference channels;

(d) outputting gas from the reference and measurement channels through nozzles to impinge upon a reference surface formed by the reference plate and the measurement surface, respectively; and (e) sensing a mass flow rate across a bridge channel that connects the reference and measurement channels, the mass flow rate being representative of the magnitude of a difference between a measurement standoff and a reference standoff; and (f) compensating for mechanical instability of the proximity sensor head.

9. The method of claim 8, wherein step (e) comprises monitoring the mass flow rate across a bridge channel that connects the reference and measurement channels, the mass flow rate being representative of the magnitude of the difference between the measurement standoff and the reference standoff.

10. The method of claim 8, wherein step (e) comprises monitoring gas pressure differences in the reference and measurement channels, the gas pressure differences being representative of the magnitude of the difference between the measurement standoff and the reference standoff.

11. The method as in claim 8, further comprising performing a control action in response to said sensing step.

12. The method of claim 11, wherein said control action includes retracting said retractable gas gauge proximity sensor.

13. A method for sensing a difference in a reference standoff and a measurement standoff using a retractable liquid flow proximity sensor housed in a proximity sensor housing having a reference plate, comprising:

(a) extending the retractable liquid flow proximity sensor in the direction of a measurement surface;

(b) distributing a flow of liquid between a measurement channel and a reference channel within the proximity sensor;

(c) restricting the flow of liquid substantially evenly across cross-sectional areas of both the measurement and reference channels;

(d) outputting liquid from the reference and measurement channels through nozzles to impinge upon a reference surface formed by the reference plate and a measurement surface, respectively; and (e) sensing a flow rate across a bridge channel that connects the reference and measurement channels, the flow rate being representative of the magnitude of a difference between a measurement standoff and a reference standoff; and (f) compensating for mechanical instability of the proximity sensor housing.

14. The method of claim 13, wherein step (e) comprises monitoring the flow rate across a bridge channel that connects the reference and measurement channels, the mass flow rate being representative of the magnitude of the difference between the measurement standoff and the reference standoff.

15. The method of claim 13, wherein step (e) comprises monitoring the liquid flow differences in the reference and measurement channels, the liquid flow differences being representative of the magnitude of the difference between the measurement standoff and the reference standoff.

16. The method of claim 13, further comprising performing a control action in response to said sensing step.

17. The method of claim 16, wherein said control action is to retract said liquid flow proximity sensor.

* * * * *

UNITED STATES PATENT AND TRADEMARK OFFICE

CERTIFICATE OF CORRECTION

PATENT NO. : 6,978,658 B1
APPLICATION NO. : 11/015652
DATED : December 27, 2005
INVENTOR(S) : Peter Kochersperger It is certified that error appears in the above-identified patent and that said Letters Patent is hereby corrected as shown below:

Title Page, Item (56) on the cover page, under "Other Publications," please add the citation -- Attorney Docket No. 1857.3090000, Proximity Sensor Nozzle Shroud with Flow Curtain, filed Dec. 7, 2004 by Herman Vogel. --

Signed and Sealed this

Eighth Day of July, 2008

JON W. DUDAS

*Director of the United States Patent and Trademark Office*